United States Patent
Hayashida et al.

[11] 3,958,423
[45] May 25, 1976

[54] HYDRAULIC BRAKE BOOSTER

[75] Inventors: Yoshihiro Hayashida, Chigasaki; Tetsuo Haraikawa, Funabashi; Setsuo Mitobe, Kawasaki, all of Japan

[73] Assignee: Tokico Ltd., Kawasaki, Japan

[22] Filed: July 29, 1974

[21] Appl. No.: 492,934

[30] Foreign Application Priority Data

| | | |
|---|---|---|
| Aug. 9, 1973 | Japan | 48-89444 |
| Feb. 20, 1974 | Japan | 49-20242 |
| Mar. 7, 1974 | Japan | 49-26566 |
| Apr. 12, 1974 | Japan | 49-41146 |

[52] U.S. Cl. .............. 60/553; 60/556; 60/589; 91/391 R; 91/434; 188/347
[51] Int. Cl.² .......................... B60T 13/20
[58] Field of Search ............ 60/547, 563, 564, 584, 60/548, 556, 582, 591, 592, 572; 91/391 R, 434; 188/347, 357

[56] References Cited
UNITED STATES PATENTS

| | | | |
|---|---|---|---|
| 1,958,722 | 5/1934 | Sinclair et al. | 188/347 X |
| 2,410,269 | 10/1946 | Chouings | 60/553 |
| 3,075,499 | 1/1963 | Prather | 60/547 X |
| 3,106,874 | 10/1963 | Schultz | 60/547 X |
| 3,115,067 | 12/1963 | Ayers, Jr. | 60/547 X |
| 3,252,382 | 5/1966 | Kellogg et al. | 91/434 |
| 3,253,409 | 5/1966 | Kellogg et al. | 60/547 X |
| 3,298,177 | 1/1967 | Kellogg | 60/548 |
| 3,798,905 | 3/1974 | Tennis | 60/547 X |
| 3,845,693 | 11/1974 | Meyers | 60/548 X |

*Primary Examiner*—Martin P. Schwadron
*Assistant Examiner*—H. Burks, Sr.
*Attorney, Agent, or Firm*—Wenderoth, Lind & Ponack

[57] ABSTRACT

In a hydraulic brake booster, wherein a body, to which is coupled a master cylinder, is provided with a projecting portion extending outwardly towards the master cylinder; a power piston adapted to operate the piston of the master cylinder extends through the projecting portion to define a working chamber positioned on the side remote from the master cylinder; a pressure chamber, to which is introduced a pressure fluid from a pressure source, is provided in the middle portion of the body; and a first valve which is normally closed for controlling the communication of the pressure chamber with the working chamber and a second valve which is normally open for controlling the communication of the working chamber with a reservoir are operated by means of a valve stem member and an input shaft adapted to operate the valve stem member; the improvement in which a stop slidingly provided within the pressure chamber and adapted to receive pressure from the pressure chamber in the direction opposite to the moving direction of the input shaft at the time of operation of the hydraulic brake booster for limiting the movement of the input shaft.

6 Claims, 9 Drawing Figures

3,958,423

HYDRAULIC BRAKE BOOSTER

BACKGROUND OF THE INVENTION

This invention relates to a hydraulic brake booster for use in a vehicle.

A hydraulic brake booster is connected to a master cylinder and operated under a fluid pressure from a pressure source (such as a power pump). The hydraulic brake booster is so designed that the manipulating force of an operator acts on a valve mechanism within the booster to thereby issue an output corresponding to an input, although various types of boosters are known.

According to the present invention, there is provided a hydraulic brake booster of the type, which is connected to a master cylinder of a vehicle and functions normally as a booster of a non-stroke type (The stroke of an input shaft is determined only by opening and closing a valve mechanism incorporated therein, irrespective of the stroke of the master cylinder.), and functions to directly operate the master cylinder when a pressure source is in trouble.

The requirements for the hydraulic brake booster of the type described can be enumerated as follows:

a. Control of the output should be readily achieved and the booster provides the feeling of an output, i.e., suitable manipulating feeling to an operator.

b. The booster does not require excessive shift of a pedal, upon power operation of a brake, and it should prevent such an excessive shift of the pedal.

c. In the event of trouble in a pressure source, it should directly operate the master cylinder, with ease.

d. The construction of the booster should be simple, and it should provide high reliability in operation.

The prior art boosters of the type described all fail to meet the above requirements.

SUMMARY OF THE INVENTION

It is accordingly an object of the present invention to provide a hydraulic brake booster which satisfies the above enumerated requirements.

According to the present invention, there is provided a hydraulic brake booster, wherein a body, to which is connected a master cylinder, is provided with a projecting portion extending outwardly towards a master cylinder; a power piston adapted to operate the piston of the master cylinder extends through the projecting portion to thereby define a working chamber positioned on the side from the master cylinder; a pressure chamber, into which is introduced a pressure fluid from a pressure source, is provided in the middle portion of the body; and a first valve which is normally closed for controlling the communication of a pressure chamber with the working chamber and a second valve which is normally open for controlling the communication of the working chamber with a reservoir are operated by means of a valve stem member and an input shaft adapted to operate the valve stem member; the improvement comprising a stop slidingly provided within the pressure chamber and adapted to receive the pressure from the pressure chamber in the direction opposed to the moving direction of the input shaft at the time of operation of the hydraulic booster for limiting the movement of the input shaft.

BRIEF DESCRIPTION OF DRAWINGS

Further objects and features of the present invention will be described with reference to the attached drawings, in which.

DESCRIPTION OF THE PREFERRED EMBODIMENTS

Figure 1:
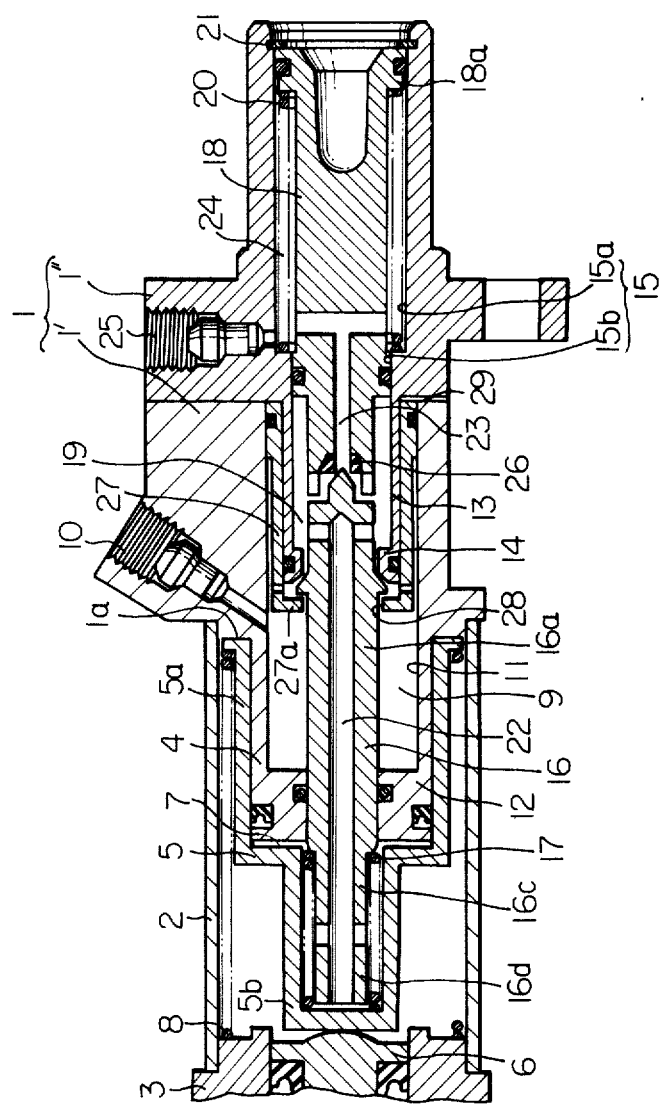
FIG. 1 is a longitudinal cross-sectional view showing the first embodiment of the present invention.
Figure 2:
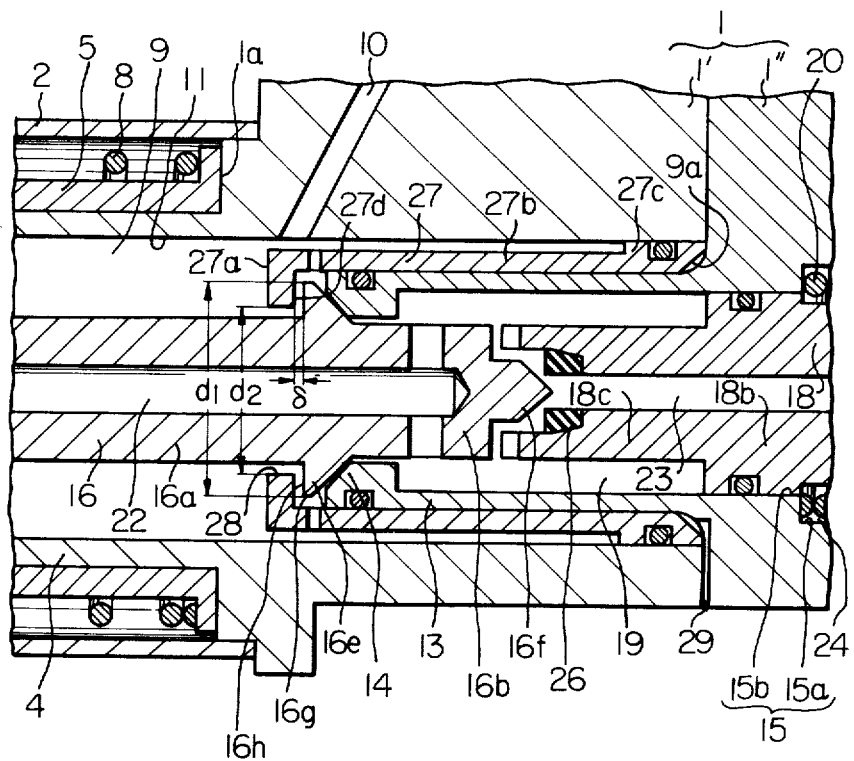
FIG. 2 is a partially enlarged cross-sectional view of a stop shown in FIG. 1.

FIG. 1 shows a cross-sectional view of the preferred embodiment of the present invention and FIG. 2 shows an enlarged view of the essential portion of FIG. 1. Shown at 1 is body proper consisting of two coupled members 1' and 1'' and attached by a spacer 2 to a master cylinder 3.

The body 1 has a projecting portion 4 which projects towards the master cylinder 3. Shown at 5 is a cup-shaped power piston the one end 5a of which having a large diameter is closely fitted over the outer periphery of the projecting portion 4 and the closed portion 5b of which is provided at the other end and has a small diameter, while cooperating with a piston 6 of master cylinder 3. There is defined a working chamber 7 in the power piston 5 positioned on the side remote from the master cylinder 3.

A spring 8 is confined between the master cylinder 3 and the power piston 5 which is loaded by the spring 8 so as to be urged towards a shoulder portion 1a of the member 1'.

Represented by 9 is a pressure chamber, into which a fluid under pressure is introduced from a pressure source (not shown) by way of a fluid inlet 10, and the pressure chamber 9 is defined by a hole 11 provided in the member 1' and the bottom wall 12 thereof, and member 1''. The member 1'' has a projecting portion 13 which projects towards the pressure chamber 9, and the projecting portion 13 has a diameter smaller than that of the hole 11, leaving an annular space therebetween. Provided in the tip portion of the projecting portion 13 is a valve seat 14, with which cooperates the valve portion of the valve stem member 16 to be described later.

Axially extending through the member 1'' is a hole 15, which consists of a large diameter portion 15a and a small diameter portion 15b that is open to the pressure chamber 9.

The valve stem member 16 extends through the bottom wall 12 in sealing and sliding relation therewith and is journalled in the bottom wall 12, while one intermediate portion 16a thereof extends through the pressure chamber 9, and the end 16b thereof extends into the interior of the small diameter portion 15*b* of the hole 15. In addition, the other end 16*c* of the valve stem member 16 extends into the working chamber 7, while the end 16*d* thereof is positioned in the close vicinity of the closed end portion 5*b* of the power piston 5. The valve stem member 16 further has a valve portion 16*e* in the portion 16*a*, the valve portion 16*e* and the valve seat 14 forming valve mechanism, i.e., a first valve which is normally closed. This valve mechanism operates as the valve portion 16*e* contacts or moves away from the valve seat 14 to thereby control the communication of the pressure chamber 9, through a relay chamber 19 and passage 22 to be described, with the working chamber 7. Shown at 17 is a spring confined between the power piston 5 and the valve stem member 16, and the spring 17 urges the valve stem member 16 in a direction so as to close the first valve.

Shown at 18 is an input shaft which has a land portions 18*a* and 18*b* which are fitted, respectively, in the large diameter portion 15*a* and the small diameter portion 15*b* of the hole 15 in sealing and sliding relation. Thus, there is defined a relay chamber 19 in the small diameter portion between the land portion 18*b* and the valve stem member 16. The input shaft 18 has a projecting portion 18*c* which extends into the relay chamber 19 and is integral with the land portion 18*b*, while the tip of the projecting portion 18*c* is positioned in the close vicinity of the end portion 16*b* of valve stem member 16. Shown at 20 is a return spring for the input shaft 18, and at 21 a retaining ring for controlling the return position of the input shaft 18. The input shaft 18 is adapted to be connected to a vehicle brake pedal.

A passage 22 provided in the valve stem 16 connects the working chamber 7 with the relay chamber 19. Shown at 23 is a passage in the input shaft 18 which connects the relay chamber 19 with a reservoir (not shown) which returns fluid to the fluid pressure source through an annular space 24 with the fluid outlet 25.

Provided on the end portion 16*b* of the valve stem member 16 within the hole 15, i.e., within the relay chamber 19 and projecting from the end portion 16*b* is a valve portion 16*f*, and a valve seat 26 is provided on the end portion of projecting portion 18*c* of input shaft 18. The valve portion 16*f* is adapted to seat on and to move away from the valve seat 26, the valve portion 16*f* and the valve seat 26 forming a second valve mechanism which is normally open, for opening and closing the passage 23 to control the communication of relay chamber 19, and hence the working chamber 7, with the reservoir through passage 23, space 24 and outlet 25.

Shown at 27 is a cup-shaped stop, the bottom portion 27*a* of which has a hole 28, through which extends the valve stem member 16, and the cylindrical portion 27*b* of which is housed in an annular space defined by the hole 11 and the projecting portion 13, while the inner periphery of the stop 27 is fitted on the outer periphery of the projecting portion 13 in sealing and sliding relation. In addition, a large diameter portion 27*c* thereof is fitted in the hole 11 in sealing and sliding relation. Defined by the stop 27 on the end toward the member 1″ is a chamber 9*a* which is in communication through a passage 29 with the atmosphere. Accordingly, the stop 27 receives pressure from the pressure chamber 9 in the direction opposed to the valve-opening direction of valve portion 16*e* to open the valve to thereby abut the member 1″. Provided on the valve stem member 16 is an abutting portion 16*g* which abuts the bottom portion 27*a* of stop 27 in the course of opening of the first valve. According to this embodiment, part of the valve portion 16*e* is formed as the abutting portion 16*g*, while the maximum diameter d1 of the valve portion 16*e* is larger than the diameter d2 of the hole 28 in the stop 27. When the stop 27 abuts the member 1″ and the valve stem 16 moves the valve portion 16*e* to the valve-closed position, there is maintained a distance δ between the abutting surfaces 27*d* and 16*h* of stop 27 and valve stem member 16, respectively. The distance δ is equal to or slightly larger than the movement of the valve portion 16*e* which is required for normal operation of a brake pedal, i.e., the input shaft due to a driver of the vehicle.

In the operation of the hydraulic brake booster shown in FIGS. 1 and 2, which shows the parts in the non-operating condition of the booster, when a driver of the vehicle treads on a brake pedal for operating the same, then the input shaft 18 will be shifted to the left thereby. The leftward shifting of the input shaft 18 will cause the valve seat 26 to abut the valve portion 16*f* of valve stem member 16, thereby interrupting the communication between the relay chamber 19, and hence, working chamber 7 with the outlet 25. When the input shaft 18 is further shifted, then the valve stem member 16 will also move in the same direction so that the valve portion 16*e* will be moved away from the valve seat 14 to thereby place the pressure chamber 9 in communication with the relay chamber 19. Thus, the pressure fluid will be introduced through the passage 22 into the working chamber 7 through radial ports 16*o* to shift the power piston 5. Thus, the power piston 6 of the master cylinder is moved in the same direction and thereby the braking operation is effected. In this respect, the extent of shifting of valve stem member 16 is controlled so as to fall within the range of the distance δ, so that there will occur no specific change in the relationship between the stop 27 and the abutting portion 16*g* of valve stem member 16.

On the other hand, the input shaft 18 receives on its pressure receiving portion on the end of portion 18*b* the same pressure which has been introduced into the working chamber 7 through relay chamber 19, so that the driver will receive a reaction force or a manipulating feeling through the input shaft 18.

As a result, during the operation, when the reaction force due to the fluid pressure acting on the input shaft 18 becomes slightly higher than the manipulating force of the driver, then the input shaft 18 will be forced back, whereupon the valve stem member 16 will also return under the action of spring 17 and the fluid pressure, so that the valve portion 16*e* will be seated on the valve seat 14 and interrupt the communication between the pressure chamber 9 and the relay chamber 19. These operations are carried out within the elastic deformation of the valve seat 26, so that the valve seat 26 and the valve portion 16*f* of valve stem member 16 will remmain in abutting relation.

When the input force is removed from the brake pedal, then the input shaft 18 will be returned until the shaft 18 abuts the retaining ring 21 under the action of spring 20 and fluid pressure. Thus, the valve seat 26 of the input shaft 18 will be moved away from the valve portion 16*f* of valve stem member 16 to place the relay chamber 19 in communication with the outlet 25. Accordingly, the power piston 5 as well will be returned to its home position, until it abuts the stop portion 1*a*, while discharging the pressure fluid in the working chamber 7, into the outlet 25 under the action of a return spring (not shown) on the piston 6 placed within the master cylinder as well as under the action of the spring 8.

Meanwhile, the manipulating feeling for the driver during the aforesaid operation is stable due to the well balanced cooperation of the operation of input shaft 18 with the fluid pressure acting on the input shaft 18, as long as the driver treads on the brake pedal slowly and operates the same normally. However, in case a brake pedal is tread upon abruptly, the valve portion 16e of valve stem member 16 will open to a large extent for a short time, then a great amount of pressure fluid within the pressure chamber 9 will flow into the relay chamber 19 and thereby produce an impact on the input shaft 18, presenting the possibility that the manipulating feeling for the driver will be instable. The present invention succeeds in avoiding such a phenomenon entirely.

In other words, even if a driver treads on the brake pedal suddenly, as long as the power source operates in the normal condition, the stop 27 will control the movement of valve stem member 16 in its valve-opening direction to a range of a distance δ by means of the abutting portion 16g and the pressure in the pressure chamber 9 acting on the stop, the aforesaid range being equal to or slightly greater than the range when the valve portion 16e is opened slowly.

As has been described, the stop 27 positively provides a driver with a stable manipulating feeling, with the opening of the valve portion 16e of valve stem member 16 being controlled to be within a given range, when the driver treads on the brake pedal suddenly. However, in the event of the loss of the pressure in the fluid pressure source, the stop nevertheless permits the free opening movement of the valve stem member 16 to permit the direct operation of master cylinder 3 by means of the input shaft 18 as well as valve stem member 16.

In other words, the loss of pressure in the fluid pressure source will lead to the loss of pressure in the pressure chamber 9, so that the movement of valve stem member 16 in the valve-opening direction exceeding the above described range δ becomes possible. Namely, when the brake pedal is operated, then the input shaft 18 will move to the left, and then the valve seat 26 will abut the valve portion 16f to drive the valve stem member 16, after which the end portion 16d of valve stem member 16 will abut the closed portion 5b of power piston 5 to drive the same. In this case, the stop 27 will be displaced to the left, with the valve stem member 16, by means of the abutting portion 16g of valve stem member 16. While the stop 27 will remain in a position, to which it has been displaced during the returning movement of the valve stem member 16; however, the large diameter portion 27c of the stop will not move to the left beyond the inlet 10, so that when the pressure of the fluid source source is restored to the normal condition to introduce pressure fluid into the pressure chamber 9, then the stopper will return to the position as shown, automatically.

In this manner, in the event of loss of pressure in the fluid pressure source, the hydraulic brake booster according to the present invention functions as a directly operating type which permits the direct operation of the master cylinder 3. However, in this case, the gap between the valve seat 26 provided on the input shaft 18 and the valve portion 16f of the valve stem member 16, and the gap between the end portion 16d of valve stem member 16 and the closed portion 5b of power piston 5 will be small, so that the ineffective part of the stroke will be minimized.

Figure 3:
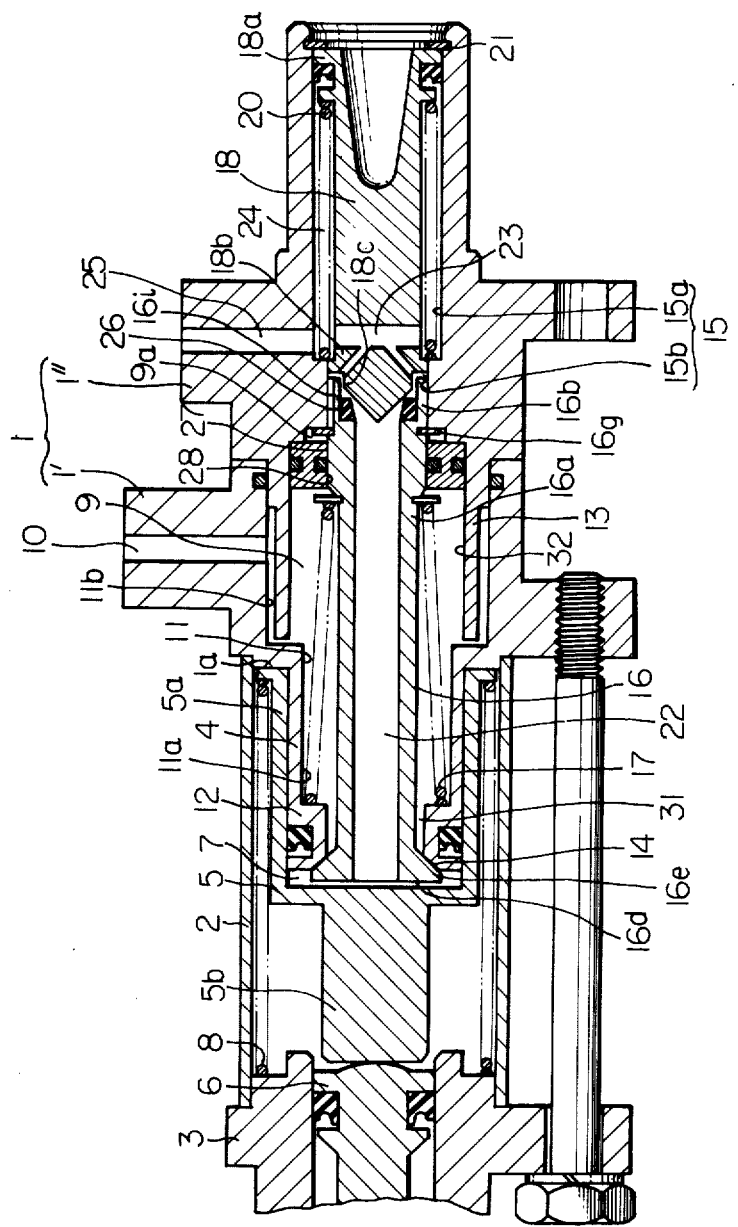
FIG. 3 is a longitudinal cross-sectional view of the second embodiment of the present invention.

FIG. 3 shows the second embodiment of the present invention, in which like reference numerals designate like parts, in common with FIG. 1.

Thus, description will be given only of the points which are different from those in FIG. 1.

In this embodiment, the relay chamber 19 used in FIG. 1 is eliminated, while the pressure chamber 9 is so designed as to directly communicate through a hole 31 in the bottom wall 12 with the working chamber 7. Thus, the opening of hole 31 in the working chamber, and the valve portion 16e of valve stem member 16 constitute the first valve. The member 16 is slidingly fitted in the small diameter portion 15b of the hole 15, while there is provided a groove 16i in the outer periphery of this fitting portion.

On the other hand, the pressure chamber 9 includes a small diameter portion 11a of the hole 11 provided in the body member 1', and a hole 32 provided in the body member 1" and communicating with the small diameter portion 15b of the hole 15, while the stop 27 is fitted in the hole 32 around the end portion 16b of the valve stem member 16 in sealing and sliding relation, respectively. The valve portion 16e of valve stem member 16 is spaced apart from the stop 27 on the opposite end of the valve stem member 16, so that the abutting portion 16g of valve stem member 16 for engaging with the stop 27 is provided as an independent member on the end portion 16b. However, although the abutting portion 16g is an independent member, this may simply be a ring, thus making no difference, as compared with the embodiment shown in FIG. 1, from the standpoint of operation. The stop 27 as well as the abutting portion 16g play an important role in the present invention, thus providing the same relationship as to the diameters d1 and d2, and the distance δ, as has been described earlier. Housed in the pressure chamber 9 is a spring 17 which urges the valve stem member 16 rightward.

On the other hand, the fluid inlet 10 is open to an annular space formed between the large diameter portion 11b of hole 11 and the projecting portion 13, and the aforesaid annular space is utilized as a fluid inlet into the pressure chamber 9.

The relationship between the valve stem member 16 and the input shaft 18 is such that the valve seat 26 is provided on the valve stem member 16, while a valve portion 18c is provided on the input shaft, which valve portion 18c together with the valve seat 26 constitutes the second valve. The parts are in the reverse relationship to that of the embodiment shown in FIG. 1. With this arrangement, the chamber 9a behind the stop 27 on the end toward the member 1" is corrected through the groove 16i with the drain (reservoir). As a result, this embodiment includes no opening to atmosphere, thus preventing intake of dust.

On the other hand, the land portion 18b of input shaft 18 need not necessarily be fitted in the small diameter portion 15b of the hole 15 in sealing relation, so that the sealing members are eliminated for this portion.

This embodiment differs from that shown in FIG. 1 in the aforesaid points, although the operation thereof is self-explanatory from the description of the embodiment of FIG. 1.

Figure 4:
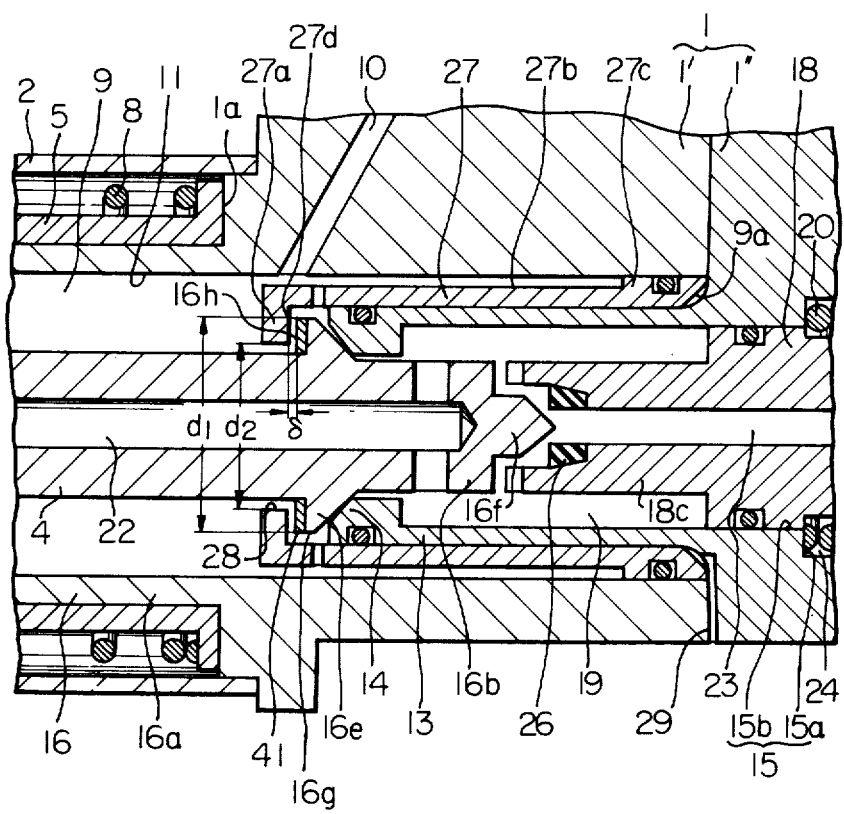
FIG. 4 is a partially enlarged cross-sectional view of a stop which is a modification of the stop of FIG. 2.

FIG. 4 shows a partially enlarged view of a further embodiment which is an improvement over the relationship between the stop 27 and the valve stem member 16, and makes no difference in the fundamental arrangement as shown in FIG. 1.

In this embodiment, a buffer means 41 is interposed between the stop 27 and the abutting portion 16g of valve stem member 16 to avoid the direct contact therebetween. The buffer means 41 may be made of a resilient material such as rubber and attached to the stop 27. However, the buffer means 41 is attached to the valve stem 16 in this embodiment. In this case, the distance between the abutting surface of the stop 27 and the abutting surface of abutting portion 16g when the device is not operating can be selected to be smaller than that when the buffer means is not provided. If desired, the distance may be entirely eliminated. (In other words, those abutting surfaces may contact each other all the time.)

With the provision of the buffer means 41, even if the driver treads on a brake pedal abruptly, the buffer means 41 will resist the movement of valve stem member in the direction to open the valve, so that the valve-opening speed will suitably slowed down, and eventually the valve stem member 16 will be stopped by means of the stop 27. As a result, an impulsive outflow of the pressure fluid from the pressure chamber 9 into the relay chamber 19 is further properly suppressed, thus presenting a better manipulating feeling to the driver. Meanwhile, when the buffer means 41 is provided, with the distance δ reduced, the buffer means 41 will be subjected to elastic deformation, although the elastic deformation will not adversely affect the operation thereof.

Figure 5:
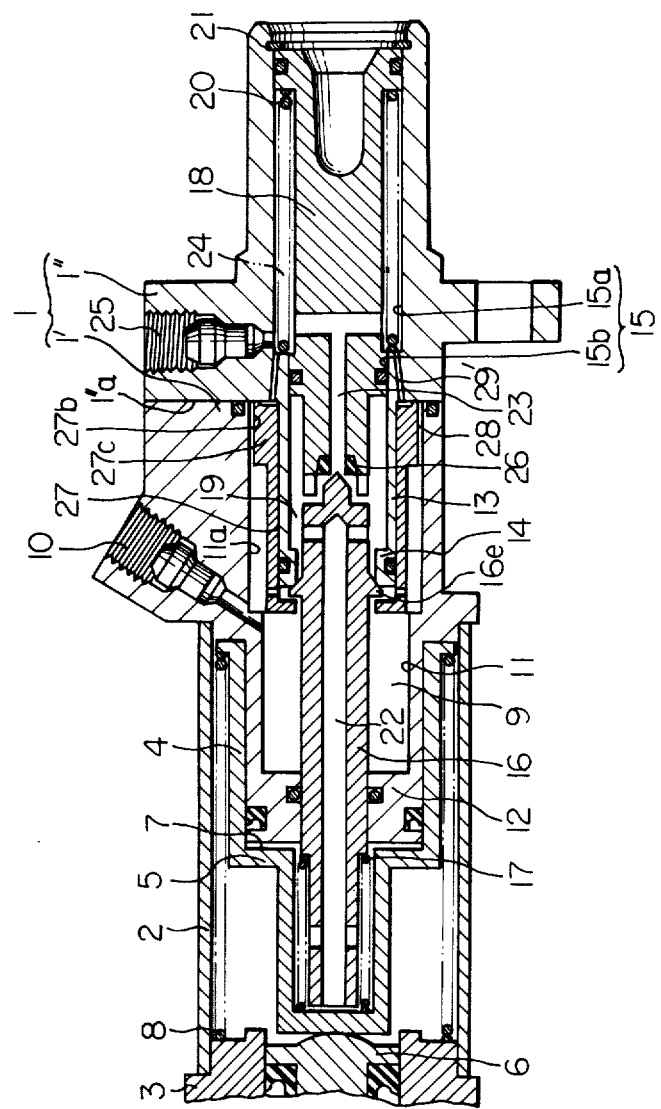
FIG. 5 is a longitudinal cross-sectional view showing a modification of FIG. 1.
Figure 6:
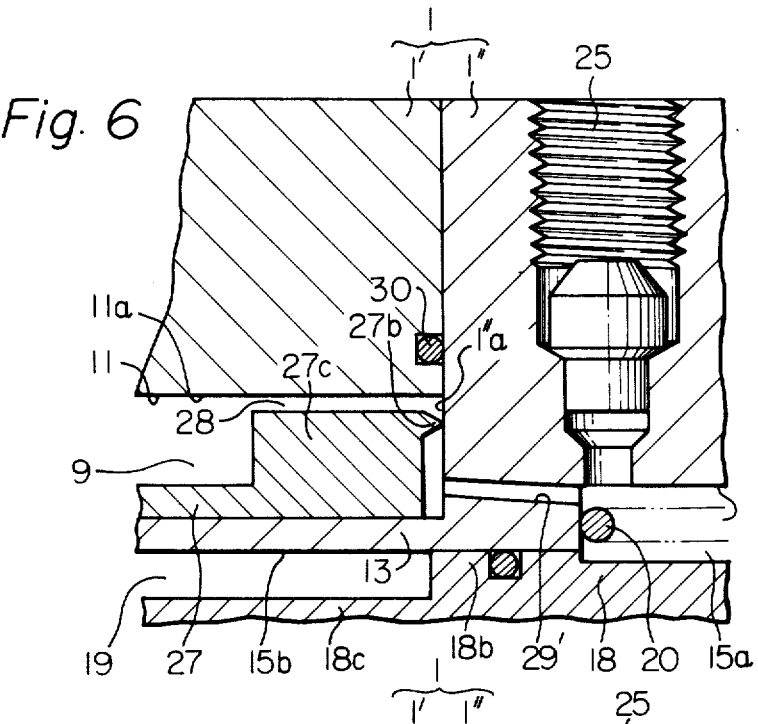
FIG. 6 is a partially enlarged cross-sectional view of the booster of FIG. 5.

FIGS. 5 and 6 show a further embodiment of the present invention, but the arrangement is similar to that shown in FIGS. 1 and 2, so that the corresponding parts are designated like reference numerals.

In this embodiment, the cup-shaped stop member 27 engages the valve portion 16e of valve stem member 16 on its bottom portion, and controls the movement of valve stem member in a manner similar to that shown in FIG. 1.

The stop 27 is provided with an annular metal seal 27b at the other end and abuts the side wall 1"a of the member 1". The diameter of the outer periphery of a large diameter portion 27c of the stop 27 is smaller than the large diameter portion 11a of the aforesaid stepped hole 11, thus leaving an annular space 28 therebetween.

Shown at 29' is a passage connecting the pressure chamber 9 with the annular space 24, this communication being interrupted by means of the metal seal 27b in the normal condition of the fluid pressure source. Shown at 30 is an O-ring which is provided as a seal between the members 1' and 1".

In this case, the stop 27 is exposed to pressure in the reservoir on its back side all the time and thus is urged to the right as viewed in the drawing by the pressure in the pressure chamber 9 in the normal condition, functioning as a stop. However, in the event of trouble in the fluid pressure souce, the seal between the metal seal 27b and the side wall 1"a of member 1" is opened due to the operation of the input shaft, with the result that, when the increase in volume of the working chamber 7 is smaller than the decrease in volume of the pressure chamber 9, the fluid in the pressure chamber 9 will flow through the passage 29' into the reservoir, due to the displacement of valve stem member 16, input shaft 18 and stop 27, thus producing no resistance against the aforesaid displacement. On the other hand, if the aforesaid relationship of the increase and decrease in volume is reversed, then fluid of an amount corresponding to the difference thus produced, in the reservoir will flow through the passage 29' into the pressure chamber smoothly, thus presenting no resistance against the aforesaid displacement.

When the aforesaid action takes place at the time of failure of the fluid pressure source, the stop 27 will remain in the position to which it has been displaced to the left as viewed in the drawing, while the large diameter portion 27c is positioned to the right of the inlet 10. Accordingly, if the pressure of the fluid source is restored and fluid under pressure is introduced into the pressure chamber 9, then the stop 27 will return to its home position shown in the drawing due to the fluid flow introduced into the pressure chamber.

Figure 7:
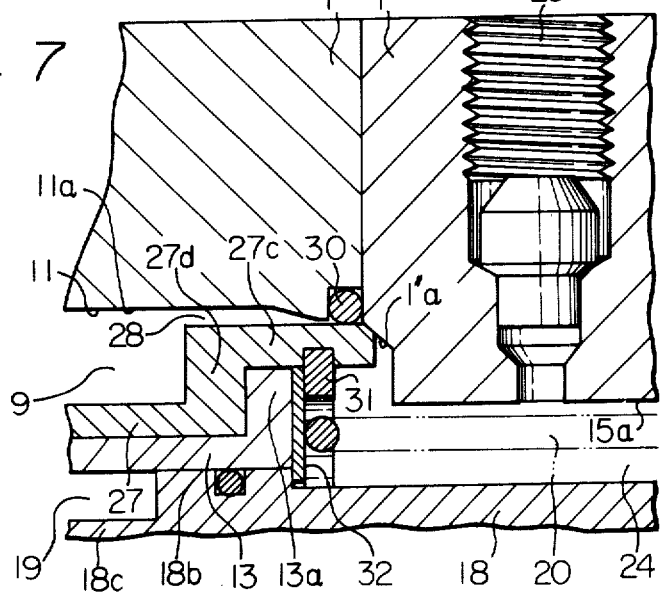
FIG. 7 is a partially enlarged cross-sectional view of a modification of FIG. 6.

FIG. 7 is an enlarged partial view of a further embodiment of the seal portion of the stop 27, and like parts are designated by like reference numerals in common with FIG. 6.

A description therefore will be given of the points which are different from the embodiment of FIG. 6.

In this embodiment, the projecting portion 13 is formed separately from the member 1", while the flange portion 13a thereof engages a shoulder portion 27d of stop 27. The projection 13 is integrally coupled to the stopper 27 by means of a retaining ring 31. Accordingly, the projecting portion 13 is held in the condition shown, coupled with the stop 27 under fluid pressure. In addition, a stop 32 is provided between the retaining ring 31 and the flange portion 13a, thereby limiting the rightward movement of the input shaft 18, as shown.

An O-ring 30 which seals the joint between the members 1' and 1" is exposed in the stepped hole 11, and the inner diameter of the O-ring is smaller than that of the large diameter portion 11a of the hole 11. The large diameter portion 27c of the stop 27 is engaged with the O-ring 30 at its outer periphery, thereby interrupting the communication of the pressure chamber 9 with the reservoir. As a result, if the outer periphery of the large diameter portion 27c of stop 27 is detached from the O-ring 30, then the pressure chamber 9 will be brought into communication with the reservoir. In this case, the metal seal 27b and the passage 29 are eliminated by the construction.

As has been described, in contrast to the previous embodiment, the pressure chamber 9 may be more positively blocked from the reservoir. On the other hand, the member 1" is provided separately from the projecting portion 13, so that the manufacture thereof is easy.

Alternately, an O-ring is disposed between the members 1' and 1" as shown in FIG. 6, and a separate O-ring is provided on the outer periphery of the large diameter portion 27c of stop 27 in a manner that the latter O-ring is engaged with the reduced diameter portion of the large diameter portion 11a.

Figure 8:
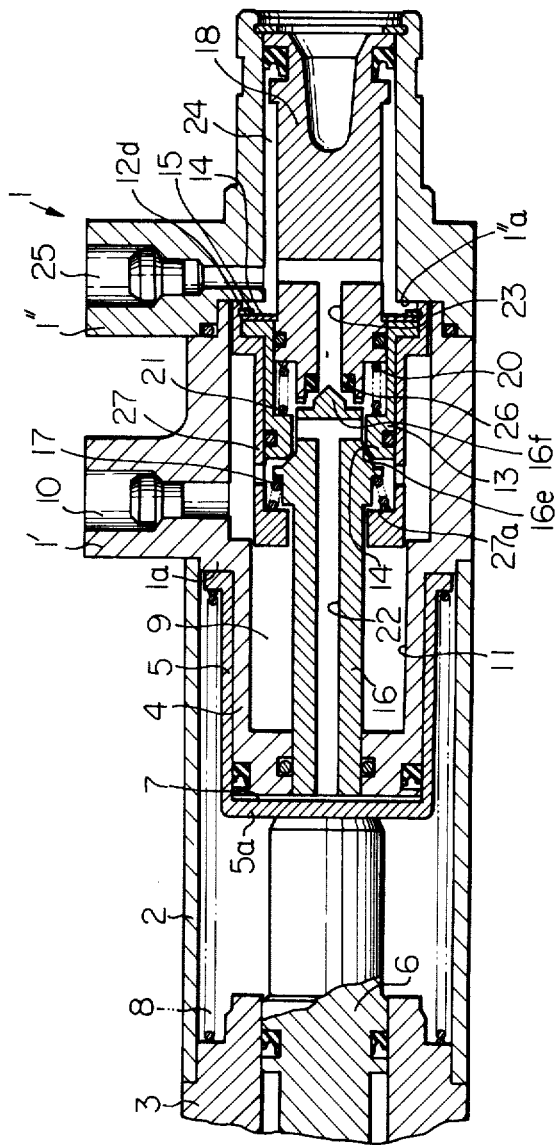
FIG. 8 is a longitudinal cross-sectional view of a further embodiment of the present invention.

FIG. 8 shows a still further embodiment of the present invention.

In this embodiment, the projecting portion 13 is provided as a separate member as in the embodiment of FIG. 7, while the stop receives the pressure from the pressure chamber 9 as in the case of FIG. 7 so as to be urged against the side wall 1"a of the body 1", thereby interrupting the communication of the pressure chamber 9 with the reservoir. A return spring 20 for the input shaft 18 is interposed between a shoulder portion which extends radially inwardly of the projecting portion 13, and the input shaft. A spring 27, which is adapted to hold the second valve in its closed position in the normal condition by acting on the valve stem member 16, is confined between the shoulder portion 27a of the stop which extends radially inwardly, and the valve stem member 16.

Those points which have not been described are the same as those of the previous embodiments, and like parts are designated by like reference numerals.

Figure 9:
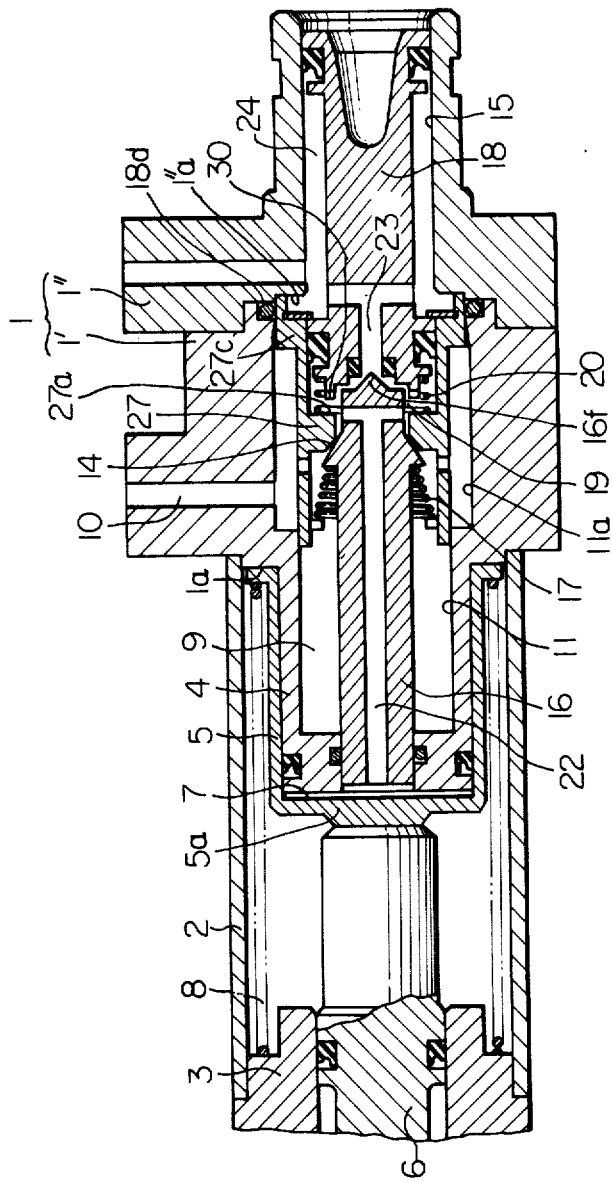
FIG. 9 is a still further embodiment of the present invention.

FIG. 9 shows a still further embodiment of the present invention.

In this embodiment, shown at 27 is a valve seat and stop member provided in an exposed relation within the pressure chamber 9, while the member 27 is provided with a valve seat 14, a cylindrical portion extending to the right therefrom, and a large diameter portion 27c which extends to the right and provides a seal portion engaged with an O-ring 30, with a gap left between the inner periphery of the large diameter portion 11a of the stepped hole 11 and the outer periphery of the large diameter portion 27c. In addition, the member 27 is provided with a projecting portion 27d which extends to the left from the valve seat 14, while the projecting portion 13d is supported by a small diameter portion of the stepped hole 11. The member receives pressure from the pressure chamber 9 so as to be normally urged to the right as viewed in the drawing, while the end portion of the large diameter portion 27c abuts the end wall 1"a of the member 1" to be stopped thereby.

A stop portion 27a of the member 27 is in the form of a shoulder which extends radially inwardly on the opposite side of the valve seat portion 14, and is in engagement with an axial end portion of the input shaft 18.

In this embodiment, like parts are designated by like reference numerals.

As is apparent from the foregoing description, the hydraulic brake booster according to the present invention is simple in construction, presenting advantages enumerated below:

a. Whether the brake pedal is operated slowly or abruptly, excellent manipulating feeling for a driver is obtained, thus presenting considerable safety when used in a brake system of a vehicle.
b. The booster serves as a non-stroke type in the normal condition of a fluid pressure source, while in the case of failure in the fluid pressure source, the master cylinder is directly operated, so that this relieves the driver of fatigue with accompanying safety.
c. The stop has a sliding resistance at the time of the initial operation when fluid pressure is lost, but does not effect the resistance thereafter. In addition, the stop may be of such a construction that if the fluid pressure is restored, the stop will automatically return to its home position. This saves the manipulating force in the event of trouble with the fluid pressure source, with the accompanying readiness for maintenance.
d. The valve seat may be provided integrally with the stop, and this facilitates the manufacture of the body or other parts, as well as the assembling operation.

What is claimed is:

1. A hydraulic braking force multiplying device for motor vehicles, comprising a body coupled to a master cylinder, a portion on said body which projects in the direction of said master cylinder, a cup-shaped power piston slidably mounted on said body coaxially with the master cylinder and engaged with the piston of said master cylinder, said cup-shaped piston when it moves toward said master cylinder defining therewithin and with said projecting portion a working chamber, said body having a pressure chamber therein having means for placing said pressure chamber in communication with a source of pressurized fluid, said body having a bore therein on the end remote from said projecting portion and opening into said pressure chamber, an input shaft slidable in said bore in the direction of movement of said cup-shaped power piston on said projecting portion, said input shaft having a drain bore therethrough in communication with a drain to a fluid reservoir, a valve stem member extending through said projecting portion from said cup-shaped power piston and through said pressure chamber to adjacent the end of said input shaft and being movable into and out of said working chamber, said valve stem member having a bore therethrough opening into said working chamber and having an opening at the other end thereof adjacent said input shaft, a first valve seat means on said body and with which said valve stem member is engagable to form a first valve for placing said working chamber and said pressure chamber in communication when said first valve is open, the end of said input shaft toward said pressure chamber and the end of said valve stem member toward said input shaft having valve member means and a second valve seat means thereon cooperating to form a second valve for placing said working chamber and said drain bore in communication when said second valve is open, one of said second valve seat means and said valve member means being resilient for causing both said first and second valves to be closed during the first part of the stroke of said input shaft toward said valve stem member, whereby when there is no pressure in said pressure chamber, the power piston will be moved directly by the movement of the input shaft engaging the valve stem member which in turn engages the cup-shaped power piston, and a stop slidingly extending into said pressure chamber in the direction of movement of said valve stem member and normally held against sliding movement by the pressure fluid in said pressure chamber and having a portion thereon engaged by said valve stem member after a limited movement of said valve stem member for limiting the movement of said input shaft.

2. A device as claimed in claim 1 wherein said body has passage means therethrough from said pressure chamber and opening into said drain to the fluid reservoir, said stop member having seal means thereon normally seaing said passage means and opening said passage means when said stop is moved from its normal position a short distance.

3. A device as claimed in claim 1 in which said valve stem member has a valve member projection thereon, and said stop has a radially inwardly extending flange thereon extending inwardly past the outer periphery of said valve member projection and adjacent said valve member projection in the direction toward said cup-shaped piston.

4. A device as claimed in claim 3 in which said first valve seat means is on said body within said pressure chamber on the oppposite side of said valve member projection from said flange on said stop, whereby said pressure chamber and said working chamber are placed in communication through said bore in said valve stem member.

5. A device as claimed in claim 1 in which said stop comprises an annular member through which said valve stem member extends in sliding sealing engagement, said valve stem member having at least one flange thereon engaging said stop member after limited movement of said valve stem member.

6. A device as claimed in claim 5 in which said first valve seat means is on said projecting portion adjacent said working chamber, whereby said pressure chamber and said working chamber are placed in communication directly and said working chamber and said drain bore are placed in communication through said bore in said valve stem member.

* * * * *